April 5, 1966   T. WEBER, JR   3,244,019
AUTOMATIC MACHINE TOOL CONTROL
Filed July 1, 1963   7 Sheets-Sheet 1

INVENTOR
THEODORE WEBER, JR.
BY
Byerly, Townsend, Watson & Churchill
ATTORNEYS.

April 5, 1966  T. WEBER, JR  3,244,019
AUTOMATIC MACHINE TOOL CONTROL
Filed July 1, 1963  7 Sheets-Sheet 4

FIG. 7.

INVENTOR
THEODORE WEBER, JR.
BY
Byerly Townsend, Watson & Churchill
ATTORNEYS.

FIG. 9.

INVENTOR
THEODORE WEBER, JR.
BY
Byerly, Townsend, Watson & Churchill
ATTORNEYS.

FIG. 10.

INVENTOR
THEODORE WEBER, JR.
BY
Byerly Townsend, Watson & Churchill
ATTORNEYS.

United States Patent Office 3,244,019
Patented Apr. 5, 1966

3,244,019
AUTOMATIC MACHINE TOOL CONTROL
Theodore Weber, Jr., Nyack, N.Y., assignor to Howard Holmes, Incorporated, Elmsford, N.Y., a corporation of New York
Filed July 1, 1963, Ser. No. 292,010
8 Claims. (Cl. 74—365)

The present invention relates generally to the automatic control of a machine tool and to an arrangement for automatically positioning a movable member in accordance with a pre-recorded schedule.

Automatic machine tool control is now in great demand to supply the needs of industry. Such control must be accurate, flexible and dependable. Attempts have been made in the past to employ pre-recorded data for such control. Some of these have used stepwise control of the machine tool relying upon the use of successive differences. That is, the differences between successive adjustments which are required of the tool are computed in advance and that information is employed to step the tool in corresponding incremental fashion. Unfortunately, this technique suffers from the drawback that any and all errors are cumulative since each adjustment starts with the assumption that the previous one was correct.

In my copending application Serial No. 214,542, filed August 3, 1962 for "Method and Apparatus for Generating Cams" there is described apparatus which eliminates the cumulative errors inherent in prior stepwise control by making use of the dimensional information in a more direct manner such that each adjustment is substantially independent of any prior adjustment. For this purpose, the dimensional information is computed, preferably in binary notation, and only a given number, e.g., six, of the least significant digits are used for control. It will be understood that the maximum value significance of a six digit binary number is 63. As described in my aforesaid application, the use of six binary digits permits a shaft to be controlled in terms of 64 definable positions; and the apparatus described therein is capable of rotating a shaft toward each definable angular position in that direction which requires the least movement.

The apparatus described in my prior application has functioned with considerable accuracy in the production of cams of varying configuration. However, since the capacity of the equipment is limited to incremental shaft rotations of less than 180°, there is a limitation placed upon the maximum slope function or velocity. With this in mind, it is an object of the present invention to provide a machine tool control which is capable of providing smoother control with considerably increased slope capability.

The present invention employs a variable speed drive for continuously positioning a movable member. The control is effected by periodically adjusting or controlling the speed in accordance with a pre-recorded schedule. Since speed control alone is not sufficient to determine displacement accurately, there is also provided means for periodically checking or comparing the displacement with a recorded schedule, and for correcting the speed in case of any error.

Hence, in accordance with one aspect of the invention there is provided recording media containing a series of sequential entries alternating in representation between (a) successive total displacement desired of a movable member from a given datum, and (b) the desired relative velocity of movement of the member between successive displacements.

In accordance with another aspect of the invention there is provided apparatus for controlling a rotatable shaft comprising in combination: (a) a continuously adjustable speed changing device, (b) means coupled to an input thereof for driving the speed changing device, (c) means coupled to an output of the speed changing device for driving a rotatable shaft at a rate which is a function of the output of the device, (d) means coupled to the speed changing device for periodically adjusting its speed changing ratio in accordance with a pre-recorded schedule, and (e) means coupled both to the output of the speed changing device and to the last mentioned means for periodically comparing the instantaneous position of the shaft with a pre-recorded schedule of positions and interposing in the event of discrepancy a corrective adjustment of the speed changing ratio.

For the purpose of explanation, it will be convenient to describe the present invention in terms of a typical manufacturing problem, that is, in terms of the cutting of the working surface of a simple flat cam intended for operation with a straight line follower. This represents a two coordinate problem. As the cam rotates, the radial distance to its periphery or to the locus of the cam follower center must vary in accordance with whatever law or function has been prescribed. Hence, the cam can be defined in terms of radial dimension, radius vector or ordinate at each angular position or cam angle. From the ordinates it is possible to compute the slope or rate of change of ordinate for a unit change in angular position.

It will be appreciated that to achieve machining accuracy to the nearest 10,000th of an inch the ordinates, expressed in the decimal system, will normally require numbers of five or more digits. Using the binary system of notation, at least 17 digits are required to express the same numerical value. Thus, it can be appreciated that any attempt to record the complete ordinate presents a practical problem because of the unduly large recording capacity required. The use of only the least significant digits, as explained in my aforesaid application, overcomes this limitation and the same technique is employed in the present invention.

It is believed that the invention will be better understood after reading the following detailed description of one typical embodiment thereof with reference to the appended drawings in which.

A typical cam design problem may be presented by specifying the ordinates as a function of cam angles at sufficient points to enable an equation to be formulated which represents the envelope of the cam surface or the locus of its follower center. In the alternative, the function equation may be presented initially. In either case, employing suitable computing equipment it is possible to calculate the ordinates for equal increments of cam angle throughout one complete revolution. It is preferred to use electronic digital computing equipment for this purpose.

Figure 1:
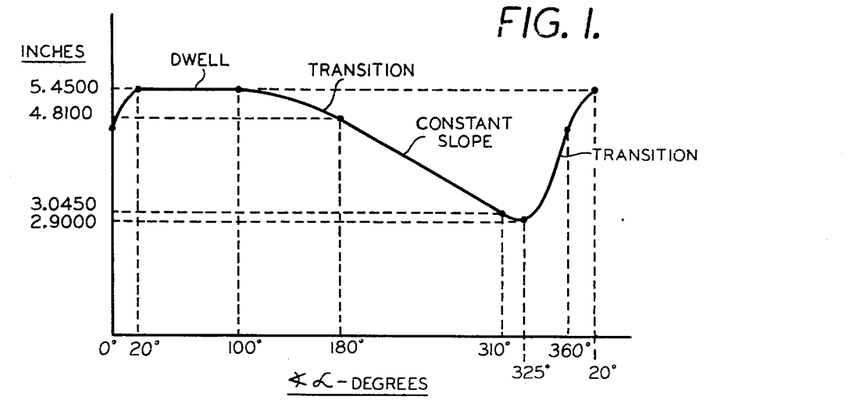
FIGURE 1 is a graph representing the desired characteristics of a cam to be machined.
Figure 2:
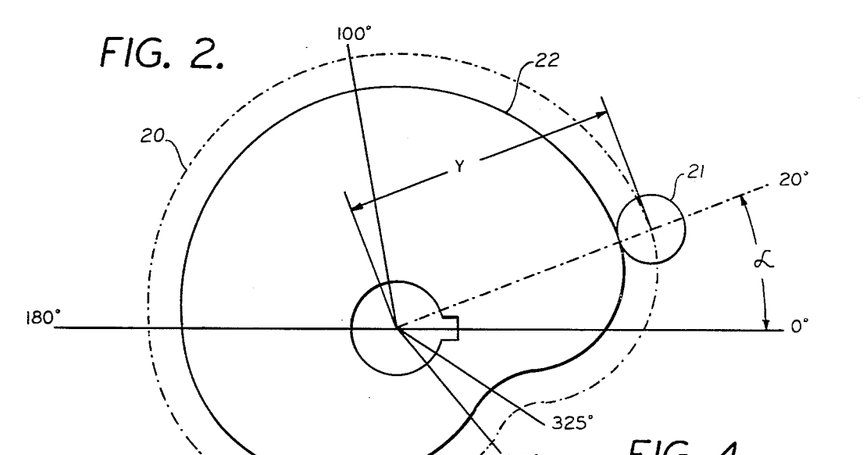
FIGURE 2 is a plan view of the cam with its roller follower.

By way of example, assume that it is desired to produce a cam having a characteristic as shown in FIGURE 1 and an actual configuration as best seen in FIGURE 2. In the figures the cam angle is represented by $\alpha$ and the radius vector or ordinate to the center of the roller follower by the symbol Y. The dot dash line 20 in FIGURE 2 represents the locus of the center of the follower 21 as it rides along the surface of the cam 22. The distance to the center of the follower is used for a reason which will become evident upon understanding the operation of the equipment.

From the graph it will be seen that the cam is to be characterized by a constant slope from a cam angle of 180° to a cam angle of 310°, varying from a radius of 4.8100 inches to a radius of 3.0450 inches, a dwell at 5.4500 inches from 20° to 100°, and transition curves inbetween. The following tabulation represents a typical sequence of calculated ordinates for a portion of the transition curve in the vicinity of a cam angle of 355°. The interval chosen is 12 minutes of arc which provides for 1800 ordinates in a complete revolution.

| $\alpha$ (degrees) | Y (inches) |
| --- | --- |
| 355°0′ | 4.5408843751 |
| 355°12′ | 4.5458031255 |
| 355°24′ | 4.5506968757 |

It should be observed that the values for Y are represented in the decimal system out to ten decimal places. This is purely arbitrary depending upon the accuracy desired. Furthermore, the decimal system is being used in this explanation because of convenience, it being understood that due to the nature of the computer employed, the computation may be handled throughout in binary notation.

From the ordinates it is possible to compute the slope of the cam surface between adjacent ordinates. For the above values of Y there is obtained:

| $\alpha_1$ to $\alpha_2$ | Slope (inches/12′ of arc) |
| --- | --- |
| 355°0′–355°12′ | .0049187504 |
| 355°12′–355°24′ | .0048937502 |

The foregoing figures are large and unwieldy. The desired degree of accuracy can be obtained by rounding off or truncating the figures as shown in the further tabulation to follow. By suitable mathematical conversion the decimal point may be eliminated. Furthermore, assume as described in my aforementioned application that a 6 digit binary code will be used to position the control shaft of the machine tool. As mentioned above, this enables the shaft to be rotated to 64 definable positions. Hence, the value for Y and slope, represented above in decimal notation, must be converted to binary notation. Since only the six least significant binary digits are of interest, the conversion can be accomplished conveniently by dividing the decimal numbers by 64 (the maximum value-significance of a 6 digit binary number +1). The arithmetical operations are set forth below.

| Y | Slope (X) | 10,000 Y Integral part only | 160,000 X Integral part only | Y or X÷64 | |
| --- | --- | --- | --- | --- | --- |
| | | | | Quotient | Remainder |
| 4.5408843751 | .0049187504 | 45408 | 787 | 709 / 12 | 32 / 19 |
| 4.5458031255 | .0048937502 | 45458 | 783 | 710 / 12 | 18 / 15 |
| 4.5506968757 | | 45506 | | 711 | 2 |

The multiplication factors above are arbitrarily chosen to provide convenient compatibility with the particular machine tool involved and with the various gear ratios between the motive elements and the tool feeds so as to obtain the desired degree of accuracy as will be understood by those skilled in the art.

The remainders tabulated above can be converted readily to binary notation as follows:

| Decimal | Binary |
| --- | --- |
| 32 | 100000 |
| 19 | 010011 |
| 18 | 010010 |
| 15 | 001111 |
| 2 | 000010 |

A little reflection will reveal that the binary numbers listed above each consist of the six least significant digits that would exist if the entire number (e.g., 45408) were expressed in binary notation. Of course, where a digital computer of the binary type is employed no specific operation of division is required. It should also be understood that if a different number of digits are to be retained, division would be by the appropriate figure other than 64.

By proper choice of the multiplying factor it can be arranged that the maximum value difference between any two successive slope figures will be appreciably less than 32. This is necessary for proper operation of the equipment to be described hereinafter.

Figure 3:
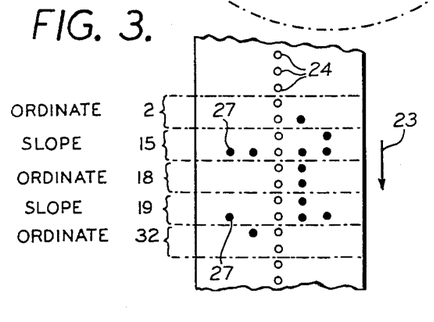
FIGURE 3 shows a portion of a punched tape in accordance with the invention.

Having obtained the six least significant digits from each calculated ordinate, this information is recorded on any suitable recording media. The apparatus being described herein makes use of punched tape, but magnetic tape or punched cards or the like could be used just as well. The portion of the tape punched for the three ordinates and two slopes listed above is shown in FIGURE 3. The direction of movement of the tape through the reader is represented by the arrow 23 while the decimal equivalents are shown adjacent the left margin of the tape in line with the corresponding recorded binary equivalent. It should be understood that each black dot represents a punched hole. Small drive sprocket holes 24 occupy the center of the tape in well known manner.

Figure 4:
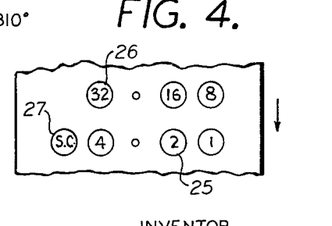
FIGURE 4 represents an enlarged portion of the tape indicating diagrammatically the punching code.

Although the tape employed has spaced for recording six digits on one line, the illustrative arrangement makes use of two lines for recording in accordance with the system shown in the enlarged fragmentary view of FIGURE 4.

Thus, a perforation at location 25 represents a value of two, a perforation at 26 represents a value of thirty two, and so forth. The reason for describing a two-line scheme for recording the six digits is because some digital computers that might be used to control the punching of the tape preempt one of the values from single line representation for actuation of the computer stop function. This is true, for example, of the Royal McBee LGP-30 computer.

In FIGURE 4 there will be observed a perforation located at 27 and identified by the abbreviation "S.C." This perforation is associated with each entry of slope data (see FIGURE 3) and performs a control or cue function for the present equipment.

Figure 5:
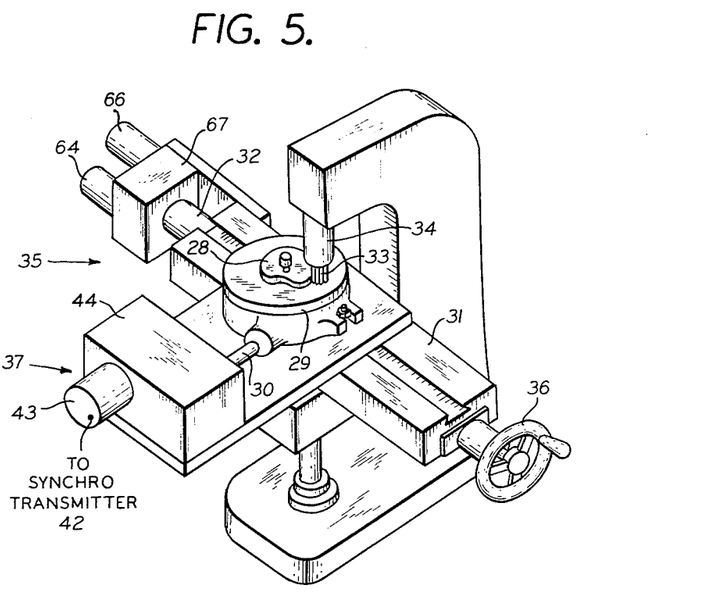
FIGURE 5 is a view of a milling machine adapted for automatic control in accordance with the invention.

The cam is to be produced on a milling machine illustratively shown in FIGURE 5. The cam blank 28 is secured to a rotary feed table 29 driven by shaft 30 and attached to the machine table 31 which is provided with a longitudinal feed including control shaft 32. The milling cutter 33 having a diameter equal to the diameter of follower 21 is chucked at the end of the rotatable arbor 34 and held in fixed position while the workpiece is fed to it by the two feeds just mentioned. Adjustment of the longitudinal feed of table 31 is obtained by rotation of the shaft 32 either by means of the drive apparatus indicated generally at 35, or, when that is disengaged, by the hand wheel 36. The shaft 30 is driven by the mechanism indicated generally at 37. The object is to rotate the workpiece in synchronism with the reading of the punched tape and to adjust the longitudinal feed accordingly.

Figure 6:
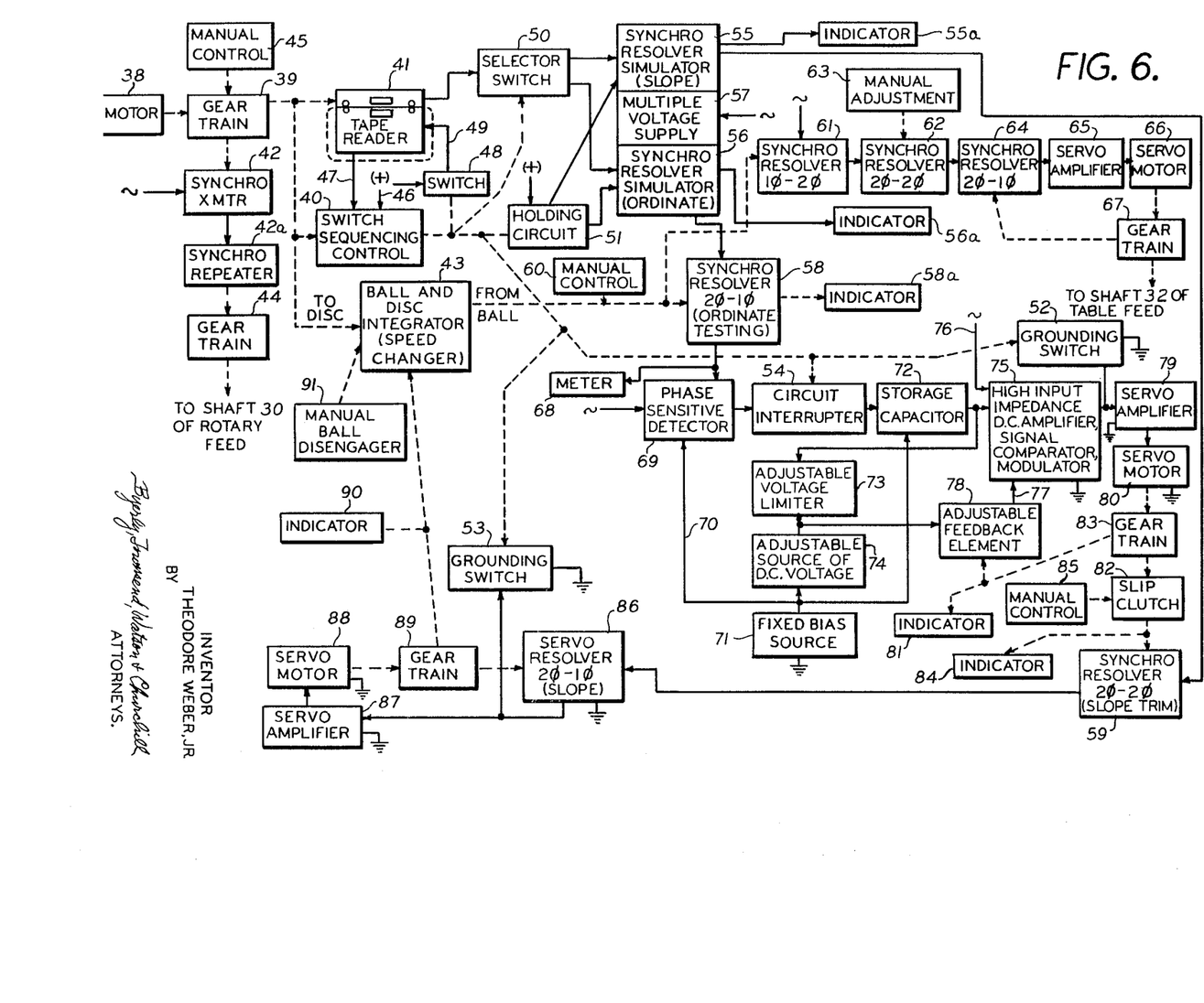
FIGURE 6 is a block diagram illustrating a typical system for practicing the invention.

Before completing the description of FIGURE 5, reference should be had to FIGURE 6. A motor 38 is arranged to drive through a suitable gear train 39 a switch sequencing control 40, the tape reader 41, a synchro transmitter 42, and the disc of a ball and disc integrator or speed changer 43. The synchro transmitter 42 is energized from a power source of alternating current and has its output coupled to synchro repeater 42a. The latter drives shaft 30 of the milling machine through the gear train 44. See also FIGURE 5. The reason for synchros 42 and 42a is to permit the motor 38 to be located near the tape reader rather than adjacent or on the machine tool.

Bearing in mind that the tape contains ordinate information corresponding to every 12 minutes of cam angle alternating with slope information, the gearing in gear trains 39 and 44 should be arranged to advance the tape to the next entry for every 6 minutes of arc through which the workpiece is rotated. A stepwise drive of the tape is required and this can be accomplished by single tooth gearing or any other well known means. A manual control means 45 is coupled to gear train 39 for manual adjustment as will be explained.

The switch sequencing control 40 is supplied with direct current over conductor 46 and is synchronized by the slope cue signals received from the tape reader 41 over conductor 47. In turn, the sequencing control 40 controls a switch 48 which controls the supply of direct current over conductor 49 to the contacts of the tape reader 41. Also controlled is the selector switch 50, a holding circuit 51, grounding switches 52 and 53, and a circuit interrupter 54.

The holding circuit 51 is supplied with direct current and controls the two synchro resolver simulators 55 and 56. The tape reader 41 also controls the simulators 55 and 56 through the selector switch 50. The simulators are described and claimed in my above mentioned application and will be described further hereinafter. For the present, assume that the simulators which are supplied by the multiple voltage supply 57 with alternating current, are capable of providing the necessary currents for energizing the quadrature field windings of the two phase input synchro resolvers 58 and 59. In addition, the simulators 55 and 56 are each provided with an indicator 55a and 56a, respectively, for a purpose to be described.

The resolver 58 has a two phase input and a single phase output on the stator and rotor, respectively. The rotor is driven by the ball output of the speed changer 43 to which it is coupled, and its position is shown by the coupled indicator 58a. The connection between the integrator 43 and the rotor of the resolver 58 is also coupled with the manual control 60 and with the single phase rotor of a synchro resolver 61. Resolver 61 is provided with a two phase stator and has its rotor energized with alternating current. The two phase output from resolver 61 is coupled to the two phase input (stator) of another synchro resolver 62 whose rotor is of the two phase variety and is manually controllable by the manual adjustment 63. The output of resolver 62 is supplied to still another synchro resolver 64. This resolver has a two phase stator input and a single phase rotor output. The electrical output is now supplied through a servo amplifier 65 to a servo motor 66. The motor 66 drives through gear train 67 the rotor of resolver 64 and the shaft 32 of the longitudinal feed. It will be understood that the servo motor 66 is arranged to drive the rotor of resolver 64 towards null position in a conventional servo loop while driving the longitudinal feed of the table 31 of the machine tool.

The single phase output of resolver 58 is connected to a meter 68 and to the input of a phase sensitive detector 69 which in turn, is supplied with alternating current as a reference signal. For a reason which will be explained later in detail, the detector 69 is also supplied over connection 70 with a fixed voltage from a fixed bias source 71.

The output of the phase sensitive detector 69 is connected through circuit interrupter 54 to a storage capacitor 72 which is also connected to the fixed bias source 71. An adjustable voltage limiter 73 biased by the adjustable source of D.C. voltage 74 superimposed on source 71 is coupled to the output of the storage capacitor 72. A high input impedance D.C. amplifier, signal comparator, and modulator 75 is supplied with alternating current over conductor 76. The signal from storage capacitor 72 is coupled to the circuit 75 for comparison with a signal received over connection 77 from an adjustable feedback element 78. The element 78 is energized from the adjustable source 74.

The modulated output from circuit 75 is coupled both to grounding switch 52 and through a servo amplifier 79 to servo motor 80. The latter drives the feedback element 78, an indicator 81, and a slip clutch 82 through a gear train 83. The output of the clutch 82 is coupled to an indicator 84 and to the rotor of the resolver 59. In addition, the slip clutch 82 is subject to control by the manual control 85. Further details of the above network will be described later with reference to FIGURES 10 to 13.

Still referring to FIGURE 6, the resolver 59 is of the type having both a two phase stator and a two phase rotor. The stator may be energized by simulator 55 while the rotor output may be connected to the two phase stator input of a synchro resolver 86. The single phase output of resolver 86 is connected through servo amplifier 87 to servo motor 88 which, in turn, drives the rotor of resolver 86 toward null in a servo loop through gear train 89. The gear train 89 is also coupled to the ball and disc integrator 43 for adjusting the position of the ball, i.e., controlling the speed changing ratio. An indicator 90 is also driven by the gear train 89 for indicating the speed changing adjustment of the integrator 43. Finally, a manual ball disengager 91 is provided for the integrator 43.

Figure 7:
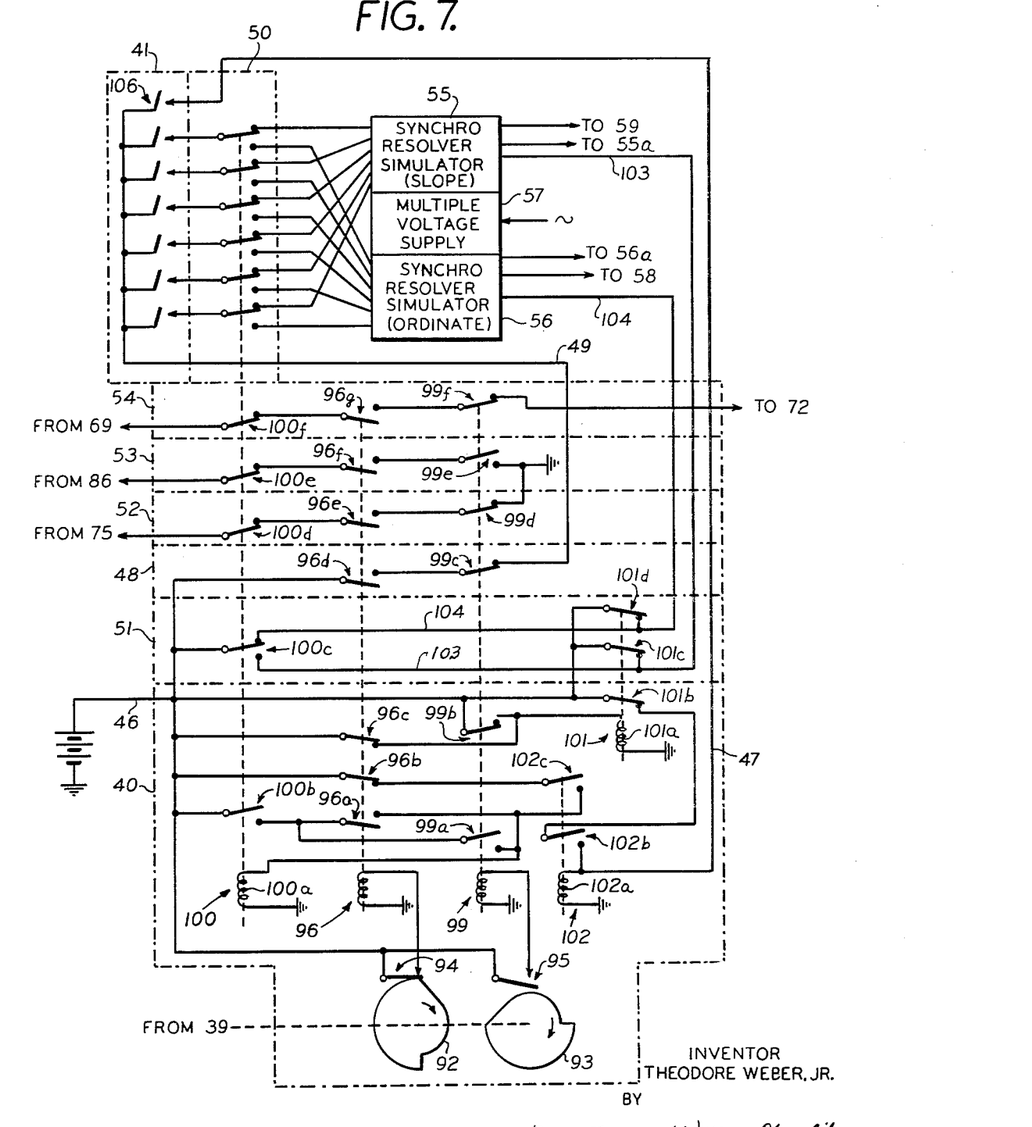
FIGURE 7 is a detailed electrical schematic diagram of the various switches and switch sequencing control shown in FIGURE 6.
Figure 8:
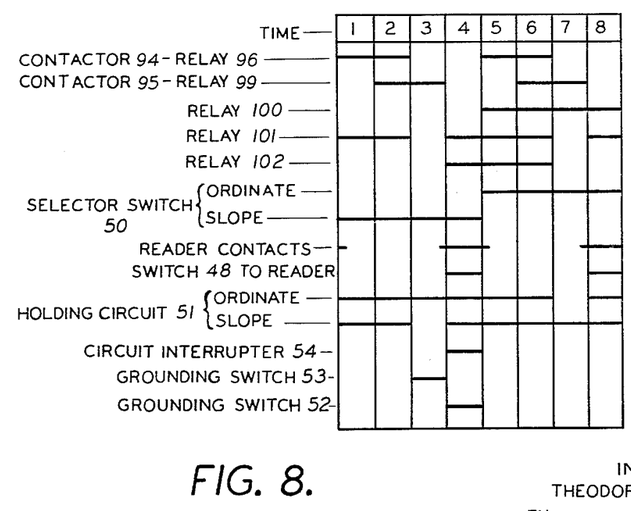
FIGURE 8 is a timing chart for use in explaining the operation of the equipment.

Reference now should be had to FIGURES 7 and 8 with the aid of which the details of the switching circuitry will be described. The same reference numerals are used where applicable to designate the same component or components.

Switch sequencing control 40 includes a pair of cams 92 and 93 which are driven continuously by a take off from gear train 39. The cams control, respectively, a pair of contactors 94 and 95 which are opened and closed in timed sequence. The solid horizontal lines in FIGURE 8 adjacent the legend identifying each contractor shows the period within one complete cycle during which the respective contactor is closed. The time intervals 1 to 8 at the top of the timing chart are in arbitrary units.

Contactor 94 is connected in series with the energizing winding of a relay 96 between ground and the conductor 46 which is connected to one side of the source of direct current the other side of which is grounded. Contractor 95 is connected in similar manner to the winding of a relay 99.

Relay 96 includes a series of seven contactors designated 96a, 96b, 96c, 96d, 96e, 96f and 96g, which, since contactor 94 is closed, are shown in the energized or actuated condition. Relay 99 includes six contactors similarly designated 99a, 99b, 99c, 99d, 99e and 99f and shown in the deenergized or unactuated condition.

Also contained in the sequencing control 40 are the windings 100a, 101a and 102a for relays 100, 101 and 102, respectively. Winding 100a controls the five contactors 100b, 100c, 100d, 100e and 100f in addition to the six selector contacts which make up the selector switch 50. FIGURE 7 has been drawn to show all of the components at time interval 1. Therefore, from FIGURE 8 it can be ascertained that relay 100 is deenergized and its contacts are illustrated accordingly.

In similar manner, relay 101 controls contacts 101b, 101c and 101d which are shown actuated, while relay 102 controls contacts 102b and 102c which are shown unactuated.

Series connected contacts 100d, 96e, and 99d make up grounding switch 52, as shown. Grounding switch 53 consists of contactors 100e, 96f, and 99e connected in series. The circuit interrupter 54 is made up of series connected contacts 100f, 96g and 99f, as shown. The contacts 96d and 99c constitute the switch 48 and are connected in series between the conductor 46 and the conductor 49 leading to the tape reading contacts in the reader 41. The contact 100c is of the double-throw variety and functions to connect conductor 46 alternatively to the conductors 103 and 104 which are connected to the holding circuits in the simulators 55 and 56, respectively. The conductor 46 is also connected to the conductors 103 and 104 in parallel through the contacts 101c and 101d when the latter are closed or actuated.

Contact 101b is connected in series with contact 102b between the conductor 46 and winding 102a as a holding circuit for the latter. The ungrounded terminal of winding 102a is also connected by conductor 47 to the tape reading contact 106 in reader 41.

The contacts 96c and 99b are connected in parallel between conductor 46 and winding 101a for controlling the energization thereof. The winding 100a is connected to the conductor 46 through a network including contacts 100b, 96a, 99a, 102c and 96b, all as shown.

Figure 9:
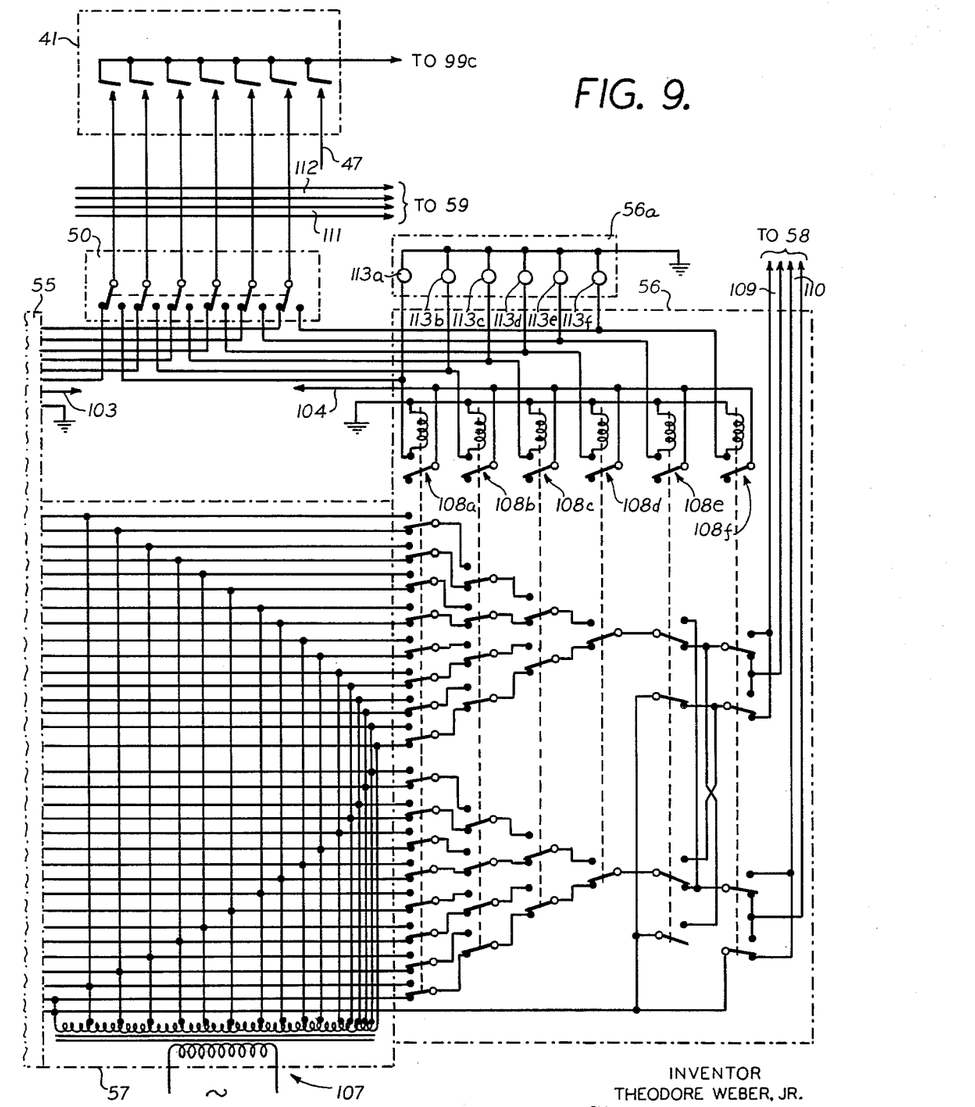
FIGURE 9 is a detailed electrical schematic diagram of the synchro resolver simulators and multiple voltage supply shown in FIGURE 6.

Reference should now be had to the details of the synchro resolver simulators 55 and 56 and multiple voltage supply 57 shown in FIGURE 9. The synchro-resolver simulators 55 and 56 each comprise a storage bank. For convenience, the simulator 55 shall be referred to as the slope bank and the simulator 56 as the ordinate bank. Only the ordinate bank is shown in detail in FIGURE 9 since both banks are identical. A complete description of the storage banks and multiple voltage supply and their operation will be found in my above identified application; hence, the following discussion will be kept as brief as possible.

The storage banks are arranged so that the entries therein are changed alternately. Cycling of the banks, clearance of old entries, registering of new entries and so forth is controlled by the selector switch 50, holding circuit 51 and tape reader 41 under the control of the sequencing control 40. The operation can be followed from the timing chart of FIGURE 8.

The taps on the transformer 107 are located so as to provide voltages proportional to the sines and cosines of sixteen equi-angular increments within the first quadrant. Each storage bank contains six relays corresponding to the six digits of the slope or ordinate information recorded on the tape. The relay 108a corresponds to the first denominational order while the relay 108f corresponds to the sixth, and the intervening relays 108b, 108c, 108d and 108e correspond to each of the intermediate orders in sequence. The switching network in the storage bank is arranged to supply to the pair of conductors 109 a voltage corresponding to the cosine output and to the pair of conductors 110 a voltage corresponding to the sine output which would be obtained from a synchro resolver having a two phase output and whose rotor was positioned at an angle corresponding to the angle represented by the tape entry. In similar manner the pairs of conductors 111 and 112 are energized by storage bank 55.

The relays in storage bank 56 are shown deenergized. They are energized when a circuit is completed through the selector switch 50, the corresponding contacts in the reader 41, and the switch 48. Each relay is provided with a holding contact which is connected to conductor 104 and, hence, remains energized until the circuit through 51 is interrupted. Conductor 103 performs the holding function for bank 55 in the same manner.

In order to provide constant supervision of the instantaneous entry in storage bank 56, the indicator 56a is provided with a series of signal lamps 113a, 113b, 113c, 113d, 113e and 113f which are connected in parallel respectively with the winding of the correspondingly lettered relay 108a through 108f. Similar lamps are provided in the indicator 55a (not shown in FIG. 9) for storage bank 55.

Figure 10:
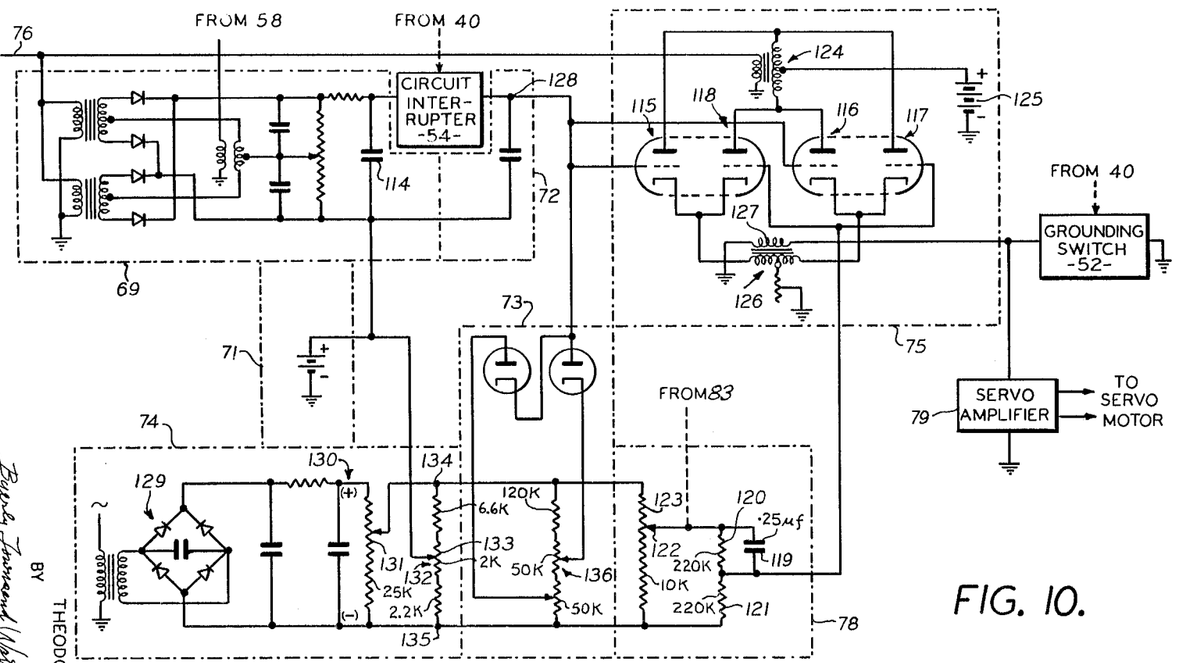
FIGURE 10 is a detailed electrical schematic diagram of the phase sensitive detector and high input impedance D.C. amplifier, signal comparator and modulator portion of FIGURE 6.

Attention should now be directed to FIGURE 10. The phase sensitive detector 69 comprises a network of unilateral conducting devices or rectifiers supplied with alternating current as a reference signal or voltage and with the signal from resolver 58. In well known manner a direct current voltage will be developed across the filter capacitor 114 having a magnitude which is proportional to the amplitude of the signal received from resolver 58 and a polarity which is dependent upon whether the signal from 58 is in phase or 180° out of phase with the reference source of alternating current.

The voltage across filter capacitor 114 will vary continually since the rotor of resolver 58 is being driven continuously. When circuit interrupter 54 is closed, storage capacitor 72 will charge to the same level and polarity as capacitor 114. When the circuit interrupter opens at the end of time interval 4 (see FIGURE 8) capacitor 72 will retain the charge prevailing at the instant of circuit interruption.

The voltage on capacitor 72 is added algebraically to the positive voltage from fixed bias source 71 and applied to the control grids of the triode elements 115 and 116. Each of the triode elements 115 and 116 is associated with a further triode element 117 and 118, respectively. The control grids of the latter are coupled through an anti-hunting network consisting of capacitor 119, resistor 120 and resistor 121 to the slider 122 of a feedback or rebalancing potentiometer 123. Collectively the potentiometer 123 and the anti-hunting network constitute the adjustable feedback element 78.

The triode elements 115, 116, 117 and 118 have their plate circuits energized with alternating current superimposed by way of transformer 124 on a source 125 of fixed voltage. The alternating component may be thought of as a carrier wave or signal. The output from the triode elements is obtained from transformer 126 in the common cathode circuit. The magnitude of the signal appearing in the output winding 127 will be a function of the difference between the voltage on slider 122 and on the terminal 128 of storage capacitor 72, both relative to ground. The phase of the current in winding 127, either in phase or 180° out of phase with the reference voltage, will depend upon whether the voltage on terminal 128 is greater or less than the voltage on slider 122.

It is believed that the operation of triode elements 115, 116, 117 and 118 will be obvious to those skilled in the art and it should be apparent that they constitute at the same time a high impedance D.C. amplifier, a signal comparator, and a modulator.

As shown, the winding 127 is connected to the grounding switch 52 and to the servo amplifier 79. A conventional rectifier circuit 129 and a filter network 130 supply direct current voltage through a potentiometer 131 to a voltage dividing network 132. The slider of the potentiometer 133 in the voltage divider network is connected to the positive terminal of the fixed bias source 71. It will be understood that the voltage at 134 will be more positive while the voltage at 135 will be less positive than the positive voltage of source 71. Hence, the voltage on slider 122 can vary above and below the voltage of source 71. It will now be understood that the source 71 assists in establishing the operating point for the triode elements.

Potentiometer 123 generally will not be provided with mechanical end stops or if it is it may be preferable to protect them in which case reliance can be had on the limiter circuit 73. The limiter may consist of the conventional diodes connected back-to-back and adjustably biased by the voltage divider 136. The operation of this form of limiter is believed to be well known.

In FIGURE 10, the values of certain circuit components have been given in conventional notation by way of additional exemplification.

Figure 11:
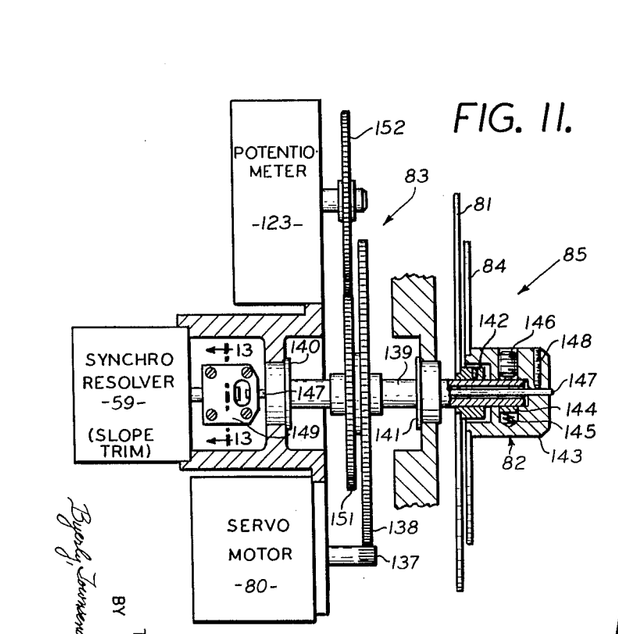
FIGURE 11 is a fragmentary view partly in section showing the mechanical interconnection between the slope trim resolver, the adjustable feedback element and the associated servo motor as shown in FIGURE 6.
Figure 12:
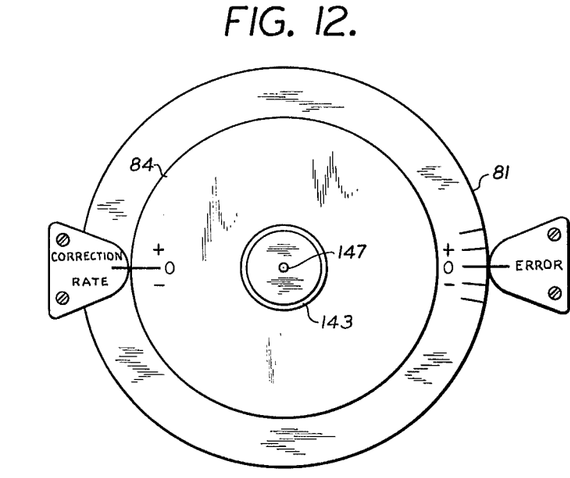
FIGURE 12 is a view of the right side of FIGURE 11 showing the indicator dials.
Figure 13:
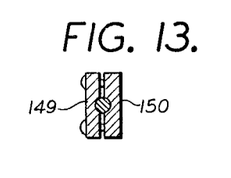
FIGURE 13 is a fragmentary sectional view taken on line 13—13 in FIGURE 11.

Finally, attention should be directed to FIGURES 11, 12 and 13. Again, the same reference numerals have been used where applicable. The shaft of servo motor 80 is provided with a pinion 137 which drives a gear 138. Gear 138 is mounted on a sleeve or tube 139 journalled in bearings 140 and 141. Indicator dial 81 with a sliding fit. A brass or bronze friction plate 144, A knob 143 is mounted on the end of the sleeve 139 with a sliding fit. A brass or bronce friction plate 144, biased by a compression spring 145, is housed in a cavity in knob 143 and bears against the sleeve 139. A screw 146 is provided as a closure member for the entrance to the cavity. In the absence of a restraining force, the knob 143 will be driven by the sleeve 139 through the friction plate 144.

A thin rod 147 passes completely through the sleeve 139. One end of rod 147 is secured by set screw 148 to the knob 143. The other end of rod 147 is clamped between the plates 149 and 150 which serve as a coupling to the shaft of the resolver 59. Hence, resolver 59 is normally driven by motor 80 through the reduction gear train comprising gears 137 and 138.

Also mounted on sleeve 139 is a gear 151 which drives the gear 152 secured to the shaft of potentiometer 123. The indicator dial 84 is secured to the knob 143, as shown.

The overall operation of the equipment can now be described. The pre-recorded or punched tape is installed in the reader at a point where the exact slope and ordinate magnitudes are known with complete accuracy. Power may have previously been applied to the switch sequencing control. When power is first applied, assuming cams 92 and 93 are in a position such that relays 96 and 99 are open circuited, relay 101 will be energized through a circuit including contact 99b. The contacts 96d and 99c will both be closed so as to energize the reader contacts. If a slope cue in the tape is in place, contacts 106 will be closed and relay 102 will be energized. Relay 100 will be deenergized and the reader contacts will be coupled through selector switch 50 to the slope bank 55 which will store the slope information. A signal will be applied through the slope trim resolver 59 to the slope resolver 86. Since time interval 4 has been assumed, grounding switch 53 will be opened and the servo loop will position the shaft of resolver 86 at an angle corresponding to the signal from bank 55 subject to any prevailing error correction superimposed on the shaft of resolver 59.

Now, manual control 45 may be manipulated to cycle the equipment so that the adjacent ordinate entry on the tape, during interval 8 may be read into storage bank 56 and illuminate the appropriate lamps 113 in indicator 56a. With the initial setup information in banks 55 and 56, manual control 45 should be manipulated until the sequencing control 40 is just about to end the fourth interval. That is, just before contactor 94 closes. This also represents the moment immediately prior to opening of circuit interrupter 54 when the position of the rotor of ordinate testing resolver 58 should correspond with the position called for by simulator 56.

Using the manual ball disengager 91 to disengage the ball, the shaft of resolver 58 will be freed for rotation by manual control 60. It should be so adjusted until the reading on indicator 58a corresponds to the reading on indicator 56a and the meter 68 reads zero voltage output from resolver 58. The indicator 58a may consist of a circular dial coupled to the shaft of resolver 58 and calibrated from zero to sixty-three in equal increments. The calibration should correspond to the sixty four selectable positions of the resolver which are associated with the corresponding coded numbers.

Next, manual adjustment 63 may be used as more fully described in my aforementioned application to locate the table 31 of the machine tool with the cutter 33 at the correct radial distance from the center of the blank 28 for the particular initial setup.

At this point, grounding switch 52 is closed causing the servo loop including motor 80 to be inoperative. Now, knob 143 should be rotated manually so as to turn the rotor of resolver 59. This will cause the servo loop including motor 88 to track and vary the position of the ball in the integrator 43. This adjustment is continued until indicator 90 shows that the integrator 43 is accurately set for the precise corresponding speed or slope. If the equipment is properly adjusted, the indicator 81 should now be set at zero error. Holding the knob 143, it is possible to rotate manually the dial 84 so as to set it at zero and thereby center or zero adjust the feedback element 78.

If the position of shaft 30 of the rotary feed has also been correctly preset, the machine should be ready to commence operation. The integrator ball should be engaged and the motor 38 may be started. Of course, the machine tool cutter has been placed in operation.

The longitudinal feed of the machine tool will be driven at the rate determined by the speed changer 43. The switch sequencing control 40 will be cycled. As each successive slope entry is entered in simulator 55 the integrator 43 will be readjusted. The control is continuous except for interval 3 when grounding switch 53 closes to lock out servo motor 88, and the holding circuit 51 interrupts circuit 103 to the simulator.

All integrators are subject to cumulative errors which add to the inherent errors in the various mechanical parts and so forth. Hence, the instantaneous position of the longitudinal feed may not correspond precisely with the desired ordinate. This will be reflected in an output from resolver 58 as explained above. When such an error is detected, servo motor 80 will be driven to superimpose an adjustment on resolver 59 which will result in readjustment of integrator 43. Because the errors are random it is advisable to under correct the adjustment of slope resolver 86. This can be controlled by suitable preliminary adjustment of the potentiometer 131 which determines the voltage applied to feedback potentiometer 123. Trial and error will indicate the optimum percentage correction to be achieved during each cycle.

During operation of the equipment, the indicators 81 and 84 will afford the operator an indication of the accuracy with which the equipment is tracking.

It should now be apparent that the system is limited basically only by the range of the integrator 43. In practice, this has not proven to be significant, and the equipment has operated most satisfactorily. Of course, there is a limitation on the acceleration that can be obtained since the signal provided by the slope simulator 55 can not be permitted to change at any one instant more than that corresponding to something less than 180° rotation of the slope resolver 86. Otherwise, an ambiguity will arise. Where the acceleration required in a specific case is excessive, it may be necessary to use the system described in my prior application.

The invention has been described with reference to a presently preferred embodiment thereof. It will be obvious to those skilled in the art that certain changes may be made in the details of construction without departing from the true spirit of the invention as defined in the appended claims.

What is claimed is:

1. For use in positioning a movable member in accordance with a pre-recorded schedule,
   recording media containing a series of sequential entries in machine readable form alternating in representation between (a) successive total displacement desired of said member from a given datum, and (b) the desired relative velocity of movement of said member between successive displacements.

2. For use in positioning a shaft in accordance with a pre-recorded schedule,
   recording media containing a series of entries in machine readable form representing alternately (a) each of a sequence of desired discrete shaft positions, and (b) the desired relative velocity of rotation between successive shaft positions.

3. Apparatus for positioning a shaft in accordance with a pre-recorded schedule comprising:
   recording media containing a series of entries in machine readable form representing alternately (a) each of a sequence of desired discrete shaft positions, and (b) the desired relative velocity of rotation between successive shaft positions,
   means for reading said recording media and converting said entries to electrical signals,
   and means coupled to said last mentioned means for positioning a shaft in accordance with said signals at the desired velocity to the desired positions.

4. Apparatus for controlling a rotatable shaft comprising in combination:
   (a) a continuously adjustable speed changing device having an output and both a driving and a controlling input,
   (b) means coupled to said driving input thereof for driving said speed changing device,
   (c) means coupled to said output of said speed changing device for driving a rotatable shaft at a rate which is a function of the output of said device,
   (d) means coupled to said controlling input of the speed changing device for periodically adjusting its speed changing ratio in accordance with a pre-recorded schedule, and
   (e) means coupled both to said output of the speed changing device and to said last mentioned means for periodically comparing the instantaneous position of said shaft with a pre-recorded schedule of positions and interposing in the event of discrepancy a corrective adjustment of said speed changing ratio.

5. Apparatus according to claim 4 wherein the means defined in clause (e) comprises:
   a synchro resolver having a two phase input, a single phase output, and a rotor arbor, said arbor being coupled in driven relation to said output of the speed changing device,
   means coupled to said two phase input for supplying said resolver with signals corresponding to predetermined arbor positions in accordance with a pre-recorded schedule,
   means coupled to said single phase output for periodically sampling the output thereof representing discrepancies between the actual arbor position and said predetermined position,
   and means coupled to said last mentioned means and to the means defined in clause (d) of claim 4 for modifying the adjustment of said speed changing ratio in proportion to the magnitude of said sampled output and in a direction tending to reduce said sampled output to zero.

6. Apparatus according to claim 4 wherein the means defined in clause (e) comprises:
   a synchro resolver having a two phase input, a single phase output, and a rotor arbor, said arbor being coupled in driven relation to said output of the speed changing device,
   means coupled to said two phase input for supplying said resolver with signals corresponding to predetermined arbor positions in accordance with a pre-recorded schedule,
   a phase sensitive detector coupled to said single phase output for providing a direct current voltage proportional to the discrepancy between the actual arbor position and said predetermined position,
   a capacitive storage device,
   means including a circuit interrupter coupling the output from said detector to said storage device,
   means for actuating said circuit interrupter at given instances when the actual arbor position, assuming zero error in its driven speed, should correspond with said predetermined position,
   and means coupled between said storage device and the means defined in clause (d) of claim 4 for modifying the adjustment of said speed changing ratio in proportion to the magnitude of any charge in said storage device and in a direction tending to reduce said charge to zero.

7. Apparatus for controlling a rotatable shaft comprising in combination:
   a continuously adjustable speed changing device having an output and both a driving and a controlling input,
   means coupled to said driving input thereof for driving said speed changing device,
   means coupled to said output of said speed changing device for driving a rotatable shaft at a rate which is a function of the output of said device,
   a first synchro resolver coupled with a motor in a servo loop and to said controlling input of the speed changing device for adjusting the speed changing ratio thereof,
   means coupled to said first synchro resolver for providing it with control signals in accordance with a pre-recorded schedule of desired shaft speed,
   a second synchro resolver having a two phase input, a single phase output, and a rotor arbor, said arbor being coupled in driven relation to said output of the speed changing device,
   means coupled to said two phase input for supplying said second resolver with signals corresponding to predetermined arbor positions in accordance with a pre-recorded schedule thereof,
   a phase sensitive detector coupled to said single phase output for providing a direct current voltage proportional to the discrepancy between the actual arbor position and said predetermined position, a capacitive storage device, means including a circuit interrupter coupling the output from said detector to said storage device, means for actuating said circuit interrupter at given instances when the actual arbor position, assuming zero error in its driven speed, is scheduled to correspond with said predetermined position, and means coupled between said storage device and said first synchro resolver for modifying said control signals supplied thereto in proportion to the magnitude of any charge in said storage device and in a direction tending to reduce said charge to zero.

8. Apparatus according to claim 7, wherein the means for modifying the control signals supplied to the first synchro resolver comprises a second servo loop including a motor, and a third synchro resolver, said second servo loop being arranged to displace the rotor of said third synchro resolver from a reference position an amount proportional to the charge in said storage device, and said third synchro resolver being included in the means coupled to the first synchro resolver for modifying the control signals supplied to it in accordance with the pre-recorded schedule.

References Cited by the Examiner

UNITED STATES PATENTS

| | | | |
|---|---|---|---|
| 2,869,429 | 1/1959 | Wetzel | 74—198 X |
| 2,875,390 | 2/1959 | Tripp | 74—365 X |
| 2,876,661 | 3/1959 | Jaeger | 74—821 |
| 2,916,950 | 12/1959 | Bullard | 74—821 |
| 2,956,439 | 10/1960 | Perrine | 74—198 |
| 2,959,074 | 11/1960 | Hallahan | 74—821 |
| 2,979,972 | 4/1961 | Danly | 74—821 |
| 2,982,143 | 5/1961 | Kohl | 74—365 |
| 3,009,362 | 11/1961 | Christmann | 74—198 |
| 3,010,329 | 11/1961 | Rumrill et al. | 74—198 |
| 3,040,587 | 6/1962 | Imm | 74—198 X |
| 3,051,009 | 8/1962 | Mernyk | 74—198 |
| 3,120,762 | 2/1964 | Bullard et al. | 74—365 |
| 3,150,528 | 9/1964 | Opocensky | 74—198 |
| 3,164,028 | 1/1965 | Green et al. | 74—365 |

DON A. WAITE, *Primary Examiner.*